July 3, 1951

B. G. MARKHAM ET AL 2,558,865

COWL FOR AIR-COOLED INTERNAL-COMBUSTION
ENGINES FOR AIRCRAFT

Filed Sept. 29, 1947

4 Sheets-Sheet 1

INVENTORS
BASIL G. MARKHAM
& DOUGLAS J. KENNEY
by Wilkinson & Mawhinney
ATTORNEYS

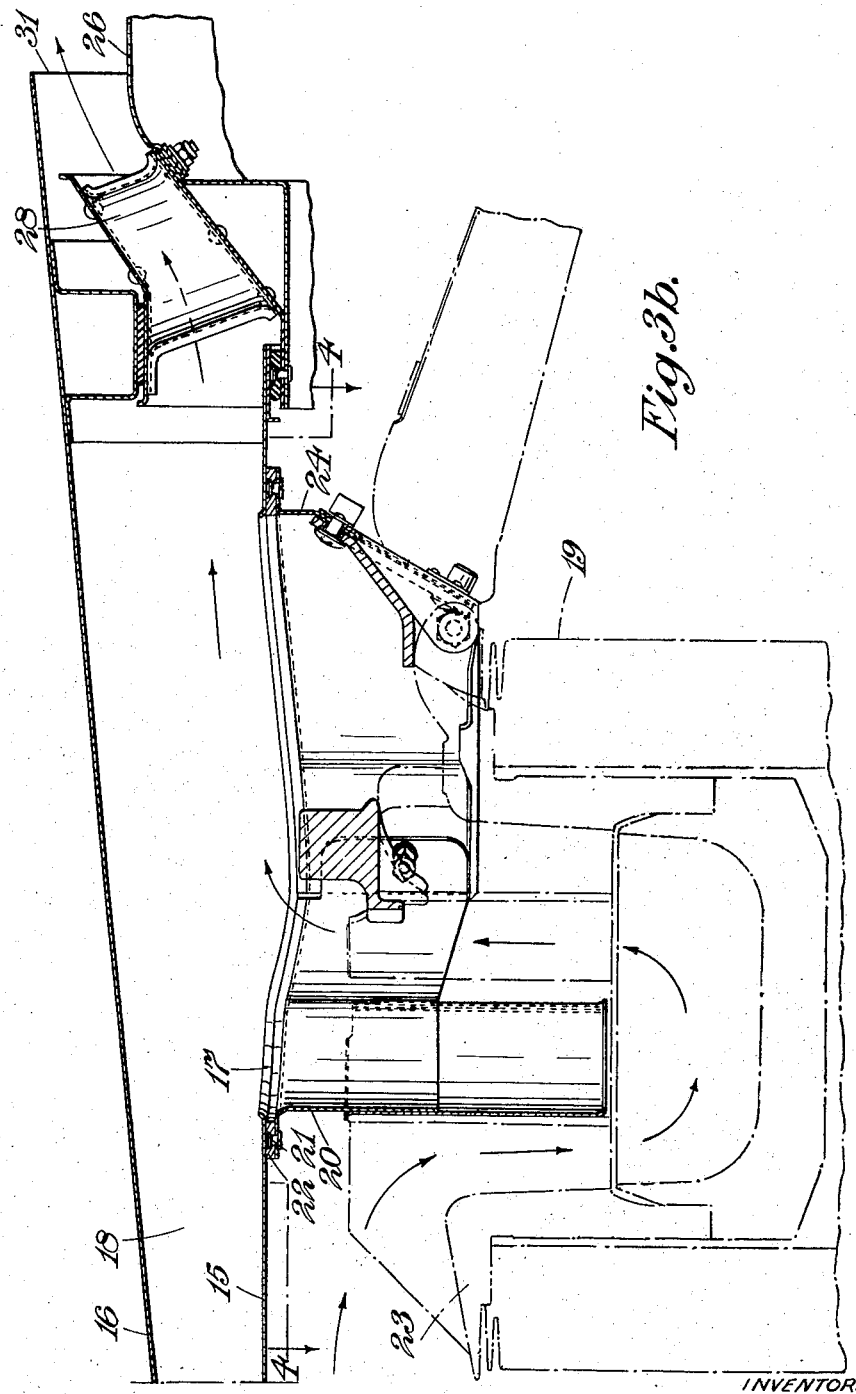

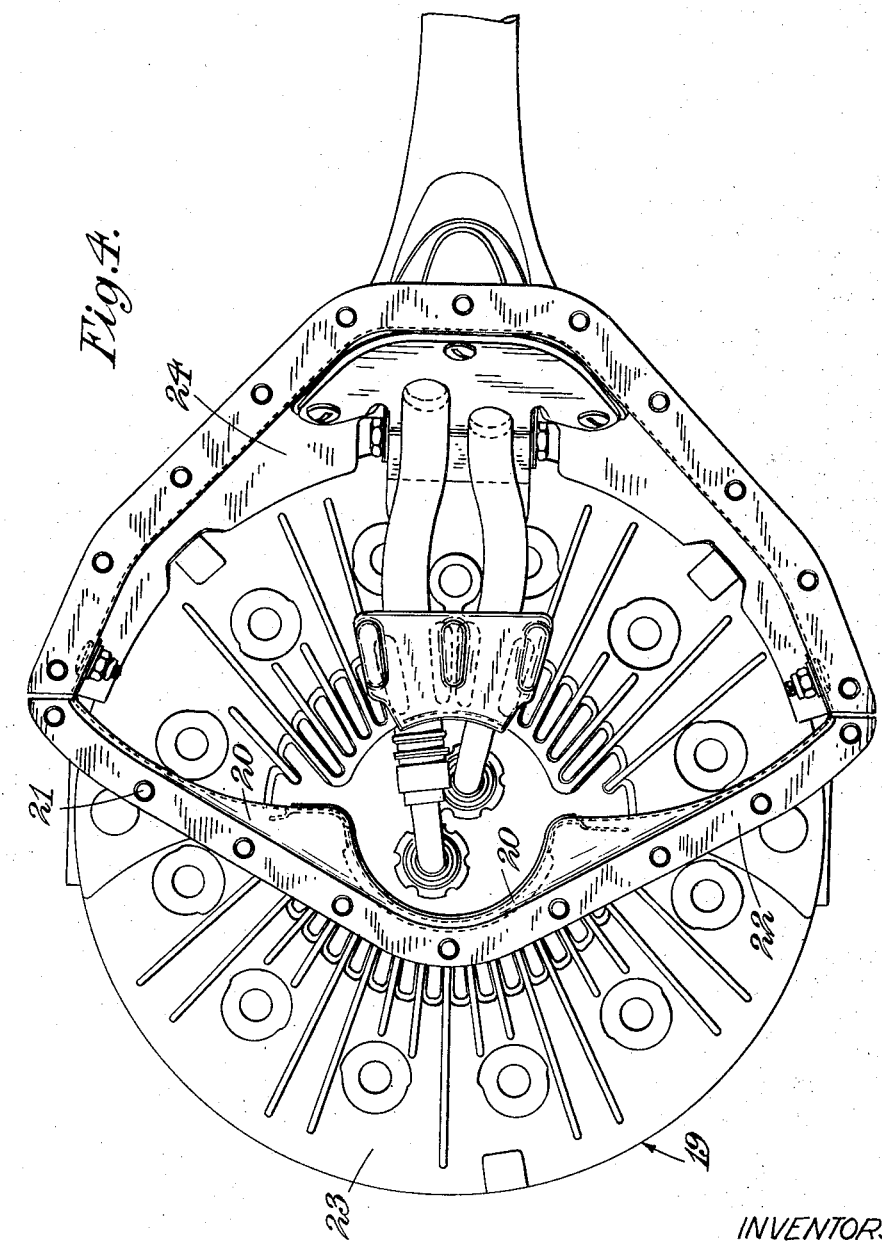

Patented July 3, 1951

2,558,865

UNITED STATES PATENT OFFICE 2,558,865

COWL FOR AIR-COOLED INTERNAL-COMBUSTION ENGINES FOR AIRCRAFT

Basil Gervase Markham and Douglas John Kenney, Bristol, England, assignors to The Bristol Aeroplane Company Limited, Bristol, England, a British company Application September 29, 1947, Serial No. 776,656
In Great Britain September 26, 1946

Section 1, Public Law 690, August 8, 1946
Patent expires September 26, 1966

2 Claims. (Cl. 123—41.6)

This invention concerns cowls for air-cooled internal combustion engines for aircraft.

The pressure existing at the leading-edge of wings having considerable depth (that is, so called thick-section wings) is positive and of some considerable value. In air-cooled engine installations carried on the leading-edge of such wings it is common practice to direct all the cooling air from the cowl through a single exit and to dispose the latter at a point adjacent the leading-edge of the wing. With such an arrangement the pressures prevailing at the leading-edge of the wing and the exit from the cowl are such as to prevent a proper flow of air through the cowl; as a result the cooling effect on the engine is reduced.

According to one feature of the present invention a cowl for an air-cooled internal combustion engine for aircraft is characterised in that the stream of cooling air entering the cowl is divided into two streams, one of which is adapted to flow over the upper part and the other over the lower part of the cylinders, and in that two outlets are provided for the cooling air, said outlets being spaced along the length of the cowl and one being provided for each stream of cooling air.

According to another feature of the present invention a cowl for an air-cooled internal combustion engine mounted on the leading-edge of the wing of an aeroplane is characterised in that the cooling air entering the cowl is divided into two streams, one for the head and the other for the barrels of the cylinder, and in that each stream is separately discharged from the cowl, the cylinder-head stream leaving the cowl through an opening situated between the entry and the discharge for the cylinder-barrel stream and outside the positive pressure region at the leading-edge of the wing.

Figure 1:
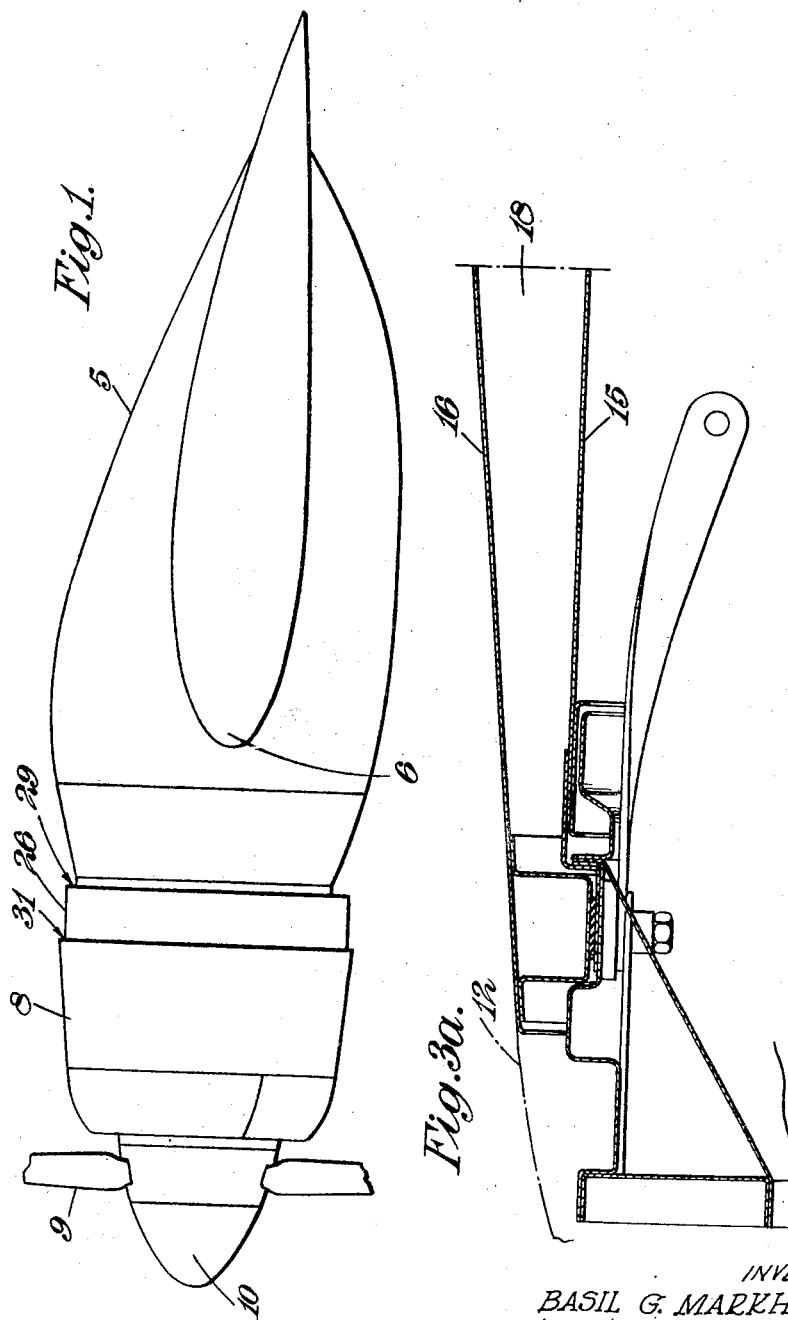
Figure 2:
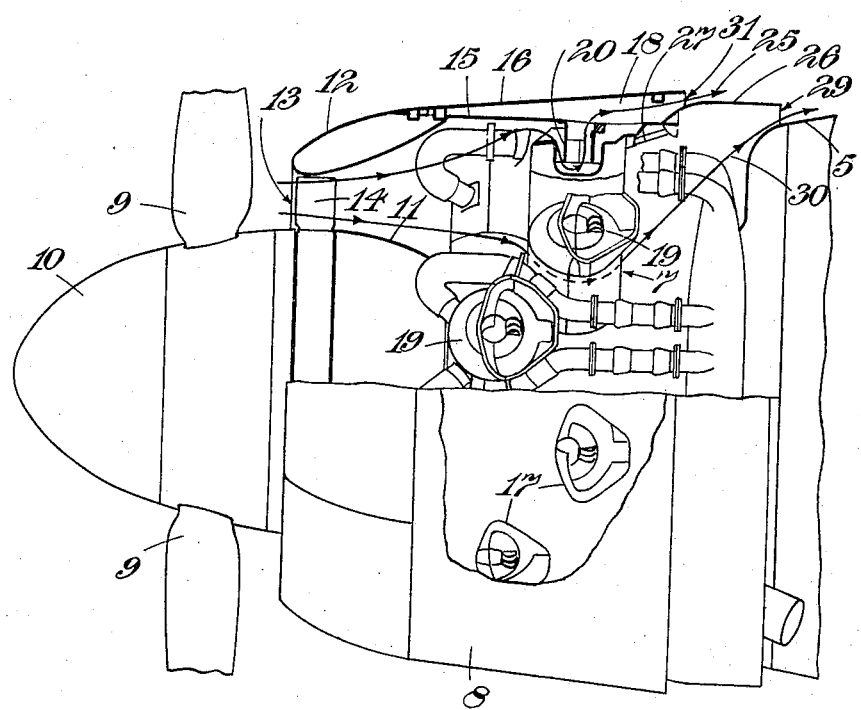

In order that the nature of the invention may be fully understood a specific embodiment of the invention will now be described, by way of example, with reference to the accompanying drawings whereof:

Figure 1 is a side view of an engine nacelle for an aeroplane a part of which is constituted by a cowl in accordance with this invention, Figure 2 is a part sectional elevation to an enlarged scale of the cowl of Figure 1 showing the engine therein, Figures 3A and 3B together constitute a sectional elevation to an enlarged scale of the cowl of Figure 2, and Figure 4 is a scrap view in the direction of arrow 4 of Figure 3.

Referring first of all to Figure 1: the nacelle which is generally indicated by the reference numeral 5 is carried in known manner by the wing 6 of the aeroplane (not shown). An engine 7 (Figure 2) is enclosed in a cowl generally indicated at 8 which forms a part of the nacelle 5. The engine drives an airscrew 9 having a spinner 10: the spinner contour is extended rearwardly as at 11 (Figure 2) and defines with the nose 12 of the cowl 8 an opening 13 through which air passes. This air enters the cowl 8 and flows over the cylinders of the engine 7 to cool the latter as later described. The air is forced through the cowl by a fan 14 lying within the opening 13 the fan being driven by the engine 7.

The cowl 8 comprises the nose 12, an inner cylindrical casing 15 and an outer cylindrical casing 16. The nose 12 is formed in three segmental parts each of which is independently removable so as to give access to the forward part of the cowl. The outer casing 16 is built up from four segmental panels which are hinged to longitudinally-extending supports whereby the panels may be opened to give access to the inner casing 15. The latter is formed in two parts which are removable to give access to the engine.

The inner casing 15 is formed with a plurality of openings 17 so that the space 18 defined between the casings 15, 16 is placed in communication with the engine space. One such opening is associated with each cylinder 19 of the engine 7 and there is attached to the leading-edge of each opening a deflector plate 20. The latter, for instance, is riveted as at 21 to the casing 15 a sealing strip 22 being provided between the two. The deflector plate 20 extends wholly across the cylinder and downwardly into the junkhead 23 (Figures 3 and 4). The rear edge of each opening similarly supports a deflector 24 which is downwardly directed to engage with the flange of the junkhead and extends from one outer edge of the deflector plate 20 to the other.

With the arrangement described a part of the cooling air entering the cowl 8 through the opening 13 will be constrained by the deflector 20 to pass downwardly into the junkhead 23 and thereafter to rise behind the deflector 20 and will be directed by the plate 24 into the space 18. This flow of air is indicated by the arrow 25 of Figure 2.

Disposed at the rear edge of the casing 16 is a cowl ring 26 which is supported from the cylinders by means of rods 27 (Figure 2) and from the rear edge of the casing 16 by a plurality of radial, spaced-apart arms 28 (Figure 3). There is thus defined between the rear edge of the casing 16 and the ring 26 an annular space 31 through which the cooling air passing along path 25 is discharged from the cowl 8.

The ring 26 is also spaced from the main part of the nacelle 5 so as to define an annular opening 29. Part of the cooling air entering the cowl 8 flows over the barrels of the cylinders 19 and being discharged therefrom is directed rearwardly through the opening 29. This flow of air is indicated by the arrow 30 of Figure 2.

It will be appreciated that the cylinder barrels are each provided, in known manner, with cylinder baffles which ensure that the cooling air is brought into intimate contact with the barrels.

It is clear from Figure 1 that the annular openings 29 and 31 are spaced apart in the lengthwise direction of the nacelle 5 so that the cooling air flowing along the path 25 is discharged at a forward part of the cowl 8 and that the cooling air flowing along the path 30 is discharged at another and more rearwardly disposed part of the cowl.

From the above description it will be clear that the stream of cooling air entering the cowl 8 through the mouth 13 is divided into two parts one of which flows over the cylinder heads to cool the latter and then enters the space 18 and is ejected in a rear direction from the annular exit 31—this is the part which follows the path indicated by arrow 25. Another stream passes over the cylinder barrels and flowing rearwardly through the cowl 8 is ejected through the second annular exit 29—this is the part which follows the path indicated by arrow 30.

With the construction described a considerable advantage is obtained when the aeroplane is powered by high-output engines and is operated at a low forward speed since under these rigorous conditions the engine cooling is adequate and an improvement over previous constructions. This improvement is attributed to:

(a) there being an unrestricted outlet for the cooling air from the cylinder heads through the exit annulus 31, the heads being the engine part which operates at the highest temperatures and thus requires greatest cooling, (b) the proportion of the air used for cooling the cylinder heads being small relatively to the total amount of cooling air (about 15%) so that with a large area for exit 31 a low static pressure is created at said exit and the drag of the cowl is kept low, (c) the relatively forward position of the annulus 31 so that it is in a position to avoid the high static pressure at the leading-edge of the wing 6; this forward disposition of the exit 31 is clear from Figure 1, and (d) the air velocity in outlet 31 being relatively low so that the effects on the air flow of variations in exit static pressure around the circumference of the cowl will tend to be equalized resulting in more uniform cylinder head cooling.

A constructional advantage of the arrangement described is that considerable saving in weight is effected by the elimination of the controllable gills and operating mechanism therefor which are normally provided to control the flow of air through an aircraft cowl. This has the further advantage of eliminating the cockpit controls associated with the gill mechanism thereby relieving the pilot (or flight engineer) of the necessity of attending to them. The simplicity of the cowl and the entire absence of moving parts effect a considerable reduction in maintenance work and the reliability and life of the power plant are accordingly increased.

We claim:

1. In combination an air-cooled, sleeve-valve internal combustion engine and a cowling therefor comprising an outer cylindrical casing to enclose the engine, there being an opening at the front end of the cowling through which all the cooling air for the engine enters and a main exit at the rear end of the cowling for that part of the stream of cooling air which flows over the cylinder barrels, a deflector carried within the cowling to direct air from the intake opening of the cowling into the re-entrant opening in each engine cylinder head and a duct to convey air from the heads rearwardly within the cowling to an exit therefrom placed axially of the cowling between the engine cylinders and the main exit from the cowling.

2. An engine cowling combination according to claim 1 wherein the duct to convey air from the cylinder heads comprises an inner cylindrical casing within and spaced from the outer casing to form an annular duct passage which is closed at the front end of the cowl and open at the rear end thereof, a deflector plate for each cylinder carried by the inner casing and entering the re-entrant opening in the cylinder head and means around an opening in the inner casing to seal the casing to each cylinder head, said opening lying downstream of the deflector plate and communicating with the re-entrant opening in the head, part of the cooling air entering the cowl being directed by the deflector plate into the re-entrant openings in the cylinder head and passing therefrom into said annular passage.

BASIL GERVASE MARKHAM.
DOUGLAS JOHN KENNEY.

REFERENCES CITED

The following references are of record in the file of this patent:

UNITED STATES PATENTS

| Number | Name | Date |
| --- | --- | --- |
| 1,691,593 | Tank et al. | Nov. 13, 1928 |
| 1,827,600 | Morgan et al. | Oct. 13, 1931 |
| 1,943,502 | Woolson | Jan. 16, 1934 |
| 1,947,221 | Niven | Feb. 13, 1934 |
| 2,168,599 | Beisel | Aug. 8, 1939 |
| 2,174,418 | Hersey | Sept. 26, 1939 |
| 2,177,642 | Fellers | Oct. 31, 1939 |
| 2,178,960 | Gagg | Nov. 7, 1939 |
| 2,244,594 | Amiot | June 3, 1941 |
| 2,366,005 | Crowe et al. | Dec. 26, 1944 |

FOREIGN PATENTS

| Number | Country | Date |
| --- | --- | --- |
| 539,934 | Great Britain | Sept. 30, 1941 |